US010680436B2

(12) United States Patent
Arai

(10) Patent No.: US 10,680,436 B2
(45) Date of Patent: Jun. 9, 2020

(54) CONSTANT CURRENT SUPPLY DEVICE, CONSTANT CURRENT SUPPLY SYSTEM, AND CONSTANT CURRENT SUPPLY METHOD

(71) Applicant: NEC Corporation, Minato-ku, Tokyo (JP)

(72) Inventor: Narihiro Arai, Tokyo (JP)

(73) Assignee: NEC CORPORATION, Tokyo (JP)

(*) Notice: Subject to any disclaimer, the term of this patent is extended or adjusted under 35 U.S.C. 154(b) by 165 days.

(21) Appl. No.: 15/745,753

(22) PCT Filed: Aug. 18, 2016

(86) PCT No.: PCT/JP2016/003761
§ 371 (c)(1),
(2) Date: Jan. 18, 2018

(87) PCT Pub. No.: WO2017/033437
PCT Pub. Date: Mar. 2, 2017

(65) Prior Publication Data
US 2018/0212425 A1 Jul. 26, 2018

(30) Foreign Application Priority Data
Aug. 24, 2015 (JP) ................. 2015-164938

(51) Int. Cl.
H02J 1/00 (2006.01)
H04B 3/44 (2006.01)
(52) U.S. Cl.
CPC . H02J 1/00 (2013.01); H04B 3/44 (2013.01)
(58) Field of Classification Search
CPC .................... H04B 3/44; H02J 1/00
See application file for complete search history.

(56) References Cited

U.S. PATENT DOCUMENTS

2002/0097754 A1* 7/2002 Arai ............... H04J 3/0632
370/519
2011/0012523 A1* 1/2011 Pasma ............ H05B 41/2853
315/246

(Continued)

FOREIGN PATENT DOCUMENTS

EP 2393221 A1 12/2011
JP H11-150492 A 6/1999
JP 2010-239563 A 10/2010

OTHER PUBLICATIONS

Japanese Office Action for JP Application No. 2017-536215 dated Feb. 5, 2019 with English Translation.

(Continued)

Primary Examiner — Alfonso Perez Borroto
Assistant Examiner — Esayas G Yeshaw

(57) ABSTRACT

In order to supply drive elements with necessary power supply while maintaining a constant current power supply system even in a case where ON/OFF control of a power source or various operation settings of the drive elements are executed at high speed, a constant current supply device 10 is provided with: a constant voltage acquisition means 20 for extracting a constant voltage from a supplied constant current; a conversion means 30 for converting the extracted constant voltage to a drive current of a desired size and outputting same; and a control means 60 for controlling the size of the drive current flowing to a current control element 5k according to control content of n-sets of drive elements 41-4n, current control elements 51-5n, and a drive element 4k, which are connected in parallel to each other, and into which the drive current is inputted.

20 Claims, 5 Drawing Sheets

(56) References Cited

U.S. PATENT DOCUMENTS

| | | | |
|---|---|---|---|
| 2013/0128641 A1* | 5/2013 | Higashihama | H05B 33/0815 363/126 |
| 2013/0249492 A1* | 9/2013 | Kim | B60L 58/14 320/128 |
| 2015/0236529 A1* | 8/2015 | Tanaka | B60L 15/20 320/109 |
| 2016/0209474 A1* | 7/2016 | Chiu | H02J 7/0047 |
| 2019/0074690 A1* | 3/2019 | Arai | H04B 3/44 |

OTHER PUBLICATIONS

International Search Report for PCT Application No. PCT/JP2016/003761, dated Oct. 18, 2016.
Written Opinion of the International Searching Authority for PCT Application No. PCT/JP2016/003761.

* cited by examiner

CONSTANT CURRENT SUPPLY DEVICE, CONSTANT CURRENT SUPPLY SYSTEM, AND CONSTANT CURRENT SUPPLY METHOD

This application is a National Stage Entry of PCT/JP2016/003761 filed on Aug. 18, 2016, which claims priority from Japanese Patent Application 2015-164938 filed on Aug. 24, 2015, the contents of all of which are incorporated herein by reference, in their entirety.

TECHNICAL FIELD

The present invention relates to constant current supply devices, constant current supply systems, and constant current supply methods, and particularly relates to a constant current supply device, a constant current supply system, and a constant current supply method that supply a constant current as a power source.

BACKGROUND ART

It is attempted to apply a submarine cable system as an observation system for earthquake, resources, and the like by mounting various sensors suitable for purposes and intended uses in submarine equipment constituting the submarine cable system. In the submarine cable system functioning as such an observation system, physical phenomena having arisen on seabed, such as a vibration, a variation of water pressure, a variation of magnetism, and the like, are measured by sensors incorporated in equipment placed on the seabed, such as a submarine repeater or the like. The submarine cable system functioning as the observation system is disclosed in, for example, patent literature (PTL) 1 and PTL 2.

Here, for the submarine cable system, there are lots of cases where the total length of the distance including a terminal device constructed on land and submarine equipment constructed on seabed is longer than or equal to 1000 km. In the case where the total length is longer than or equal to 1000 km, it is difficult to supply a constant voltage from a power supply device on land to the undersea submarine equipment. Thus, in the submarine cable system in PTL 1, a constant-current power supply scheme is employed. Here, the constant-current power supply scheme is a scheme for supplying a constant current, as a power source, to the undersea submarine equipment from the power supply device on land via a power cable.

A block configuration diagram of submarine equipment disclosed in PTL 1 is illustrated in FIG. 5. In FIG. 5, submarine equipment 900 in PTL 1 includes a switching circuit 910, a transformer 920, a rectifier circuit 930, a Zener diode 940, a heat sink 950, and an observation equipment circuit 960.

The switching circuit 910 performs switching of a constant current supplied from a power supply device on land, and generates a rectangular wave voltage. The transformer 920 converts the rectangular wave voltage, which results from the switching by the switching circuit 910, into a desired voltage, and supplies the voltage to the rectifier circuit 930. The rectifier circuit 930 rectifies and converts the supplied rectangular wave voltage of a desired magnitude into a direct-current voltage, and supplies a constant current to the observation equipment circuit 960. The observation equipment circuit 960 is subjected to power-source on/off control and various kinds of operation settings by remote control from land, and is driven by the constant current supplied from the rectifier circuit 930.

Meanwhile, the Zener diode 940 is disposed in parallel to the observation equipment circuit 960 to absorb a variation portion of power consumption in the observation equipment circuit 960, and radiates the absorbed power as heat into seawater through the heat sink 950.

The variation portion of the power consumption of the observation equipment circuit 960 is absorbed by the Zener diode 940, and thus, the sum of the power consumption of the observation equipment circuit 960 and the power consumption of the Zener diode 940 always becomes constant. The sum of the power consumption of the observation equipment circuit 960 and the power consumption of the Zener diode 940 is equivalent to an output current of the rectifier circuit 930, and thus, the output current of the rectifier circuit 930 takes a constant value. Accordingly, the submarine equipment 900 in PTL 1 operates based on the constant current.

CITATION LIST

Patent Literature

[PTL 1] Japanese Unexamined Patent Application Publication No. H 11-150492
[PTL 2] Japanese Unexamined Patent Application Publication No. 2010-239563

SUMMARY OF INVENTION

Technical Problem

However, in the case where the power consumption rapidly varies in the observation equipment circuit 960, it is difficult to cause the absorption by the Zener diode 940 to follow the rapid variation. That is, in the case where the remote control is performed from land, it is necessary to take into consideration the speed of the absorption of the power consumption in the Zener diode 940; otherwise it is difficult to promptly perform the power-source on/off control and various kinds of settings on the observation equipment circuit 960.

The present invention has been made in view of the above disadvantage, and an object of the present invention is to provide a constant current supply device, a constant current supply system, and a constant current supply method that, even in the case where any one of power-source on/off control and various kinds of operation settings on a driven element is performed at high speed, enable the supply of a necessary power source to the driven element with the constant-current power supply scheme maintained.

Solution to Problem

In order to achieve the above object, a constant current supply device according to a first aspect of the present invention includes a voltage acquisition means for extracting a constant voltage from a supplied constant current; a conversion means for converting the extracted constant voltage into a drive current of a desired magnitude, and outputting the drive current; a driven element and a current control element which are connected in parallel to each other and to which the drive current is input; and a control means for, in response to each of at least one control content of the driven element, controlling a magnitude of a drive current constituting the input drive current and flowing through the current control element.

In order to achieve the above object, a constant current supply system according to a second aspect of the present invention includes a power supply device placed on land for supplying a constant current, and the above-described constant current supply device that is placed on seabed and is supplied with the constant current via a submarine cable.

In order to achieve the above object, a constant current supply method according to a third aspect of the present invention is a constant current supply method using a current control element connected in parallel to a driven element that operates by being supplied with a constant current, and includes a process of extracting a constant voltage from a supplied constant current; a process of converting the extracted constant voltage into a drive current of a desired magnitude, and outputting the drive current; a process of supplying the output drive current to the driven element and the current control element; and a process of, in response to each of at least one control content of the driven element, controlling a magnitude of a drive current constituting the supplied drive current and flowing through the current control element.

Advantageous Effects of Invention

According to the above-described aspects of the present invention, even in the case where any one of power-source on/off control and various kinds of operation settings on the driven element is performed at high speed, a necessary power source can be supplied to the driven element with the constant-current power supply scheme maintained.

DESCRIPTION OF EMBODIMENTS

First Example Embodiment

Figure 1:
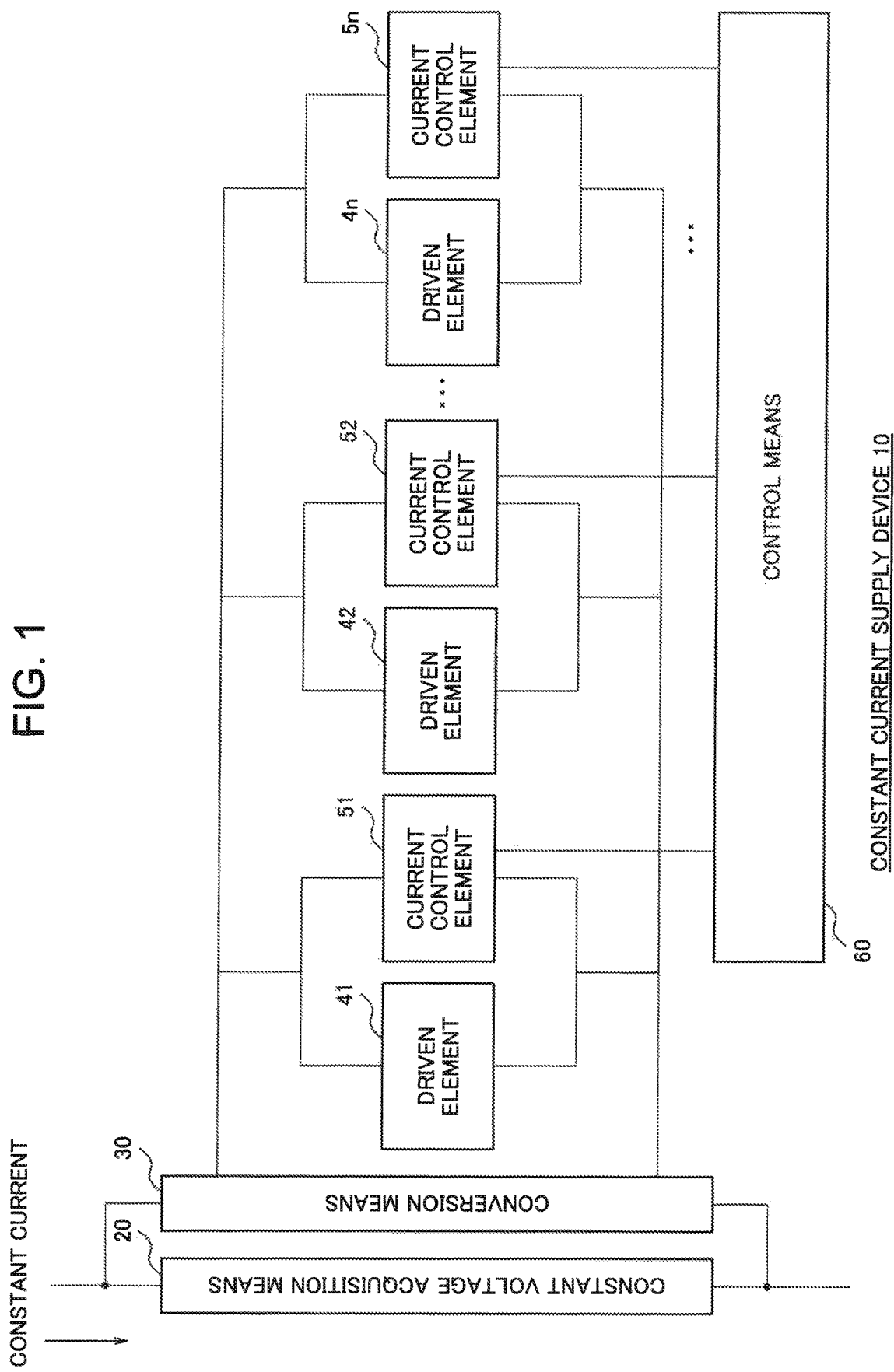
FIG. 1 is a block configuration diagram of a constant current supply device 10 according to a first example embodiment.

A first example embodiment of the present invention will be described. A block configuration diagram of a constant current supply device according to the present example embodiment is illustrated in FIG. 1. In FIG. 1, a constant current supply device 10 includes a constant voltage acquisition means 20, a conversion means 30, n sets of driven elements 41 to 4n and current control elements 51 to 5n, and a control means 60.

The constant voltage acquisition means 20 is supplied with a constant current from a constant current supply device, which is not illustrated in FIG. 1, and extracts a constant voltage from the supplied constant current.

The conversion means 30 converts the constant voltage having been extracted by the constant voltage acquisition means 20 into a drive current of a desired magnitude, and outputs the drive current. The drive current output from the conversion means 30 is supplied to each of the n sets of driven elements 41 to 4n and current control element 51 to 5n.

Each of the driven elements 41 to 4n is driven by the drive current supplied from the conversion means 30, and operates based on an instruction from the control means 60. As the driven elements 41 to 4n, for example, an accelerometer, a water pressure meter and the like for measuring data in relation to an ambient environment, and the like on seabed can be applied.

Each of the current control elements 51 to 5n is connected in parallel to a corresponding one of the driven elements 41 to 4n. As electronic loads 351 to 35n, for example, variable resistors can be applied.

The control means 60 allows each of the driven elements 41 to 4n to perform a predetermined operation and simultaneously, in response to the content of the operation of the each of the driven elements 41 to 4n, controls the magnitude of a drive current flowing through a corresponding one of the current control elements 51 to 5n. The control by the control means 60 on the magnitude of a drive current flowing through each of the current control elements 51 to 5n allows a corresponding one of the driven elements 41 to 4n to be supplied with a drive current necessary for its operation.

Here, the magnitude of the drive current allowed to flow through each of the current control elements 51 to 5n, the speed of the control, the sequence order of the control of each of the current control elements 51 to 5n, and the like in the control means 60 can be stored as control programs in advance. In this case, the control means 60 extracts and executes a control program in response to operation content of each of the driven elements 41 to 4n, and thereby is capable of appropriately controlling a drive current flowing through a corresponding one of the current control elements 51 to 5n in response to the operation content of the each of the driven elements 41 to 4n.

As described above, in the present example embodiment, in response to operation content of each of the driven elements 41 to 4n, the control means 60 proactively controls the magnitude of a drive current flowing through a corresponding one of the current control elements 51 to 5n. In this case, as compared with a case where the variation of a drive current flowing through each of the driven elements 41 to 4n is actively absorbed using a Zener diode or the like, a current most appropriate to operation content of each of the driven elements 41 to 4n can be set onto a corresponding one of the current control elements 51 to 5n at high speed, thereby enabling the each of the driven elements 41 to 4n to promptly operate. Accordingly, even in the case where any one of power-source on/off control and various kinds of operation settings on each of the driven elements 41 to 4n is performed at high speed, the constant current supply device 10 according to the present example embodiment is capable of supplying a necessary drive current to the each of the driven elements 41 to 4n with the constant-current power supply scheme maintained.

Second Example Embodiment

Figure 2:
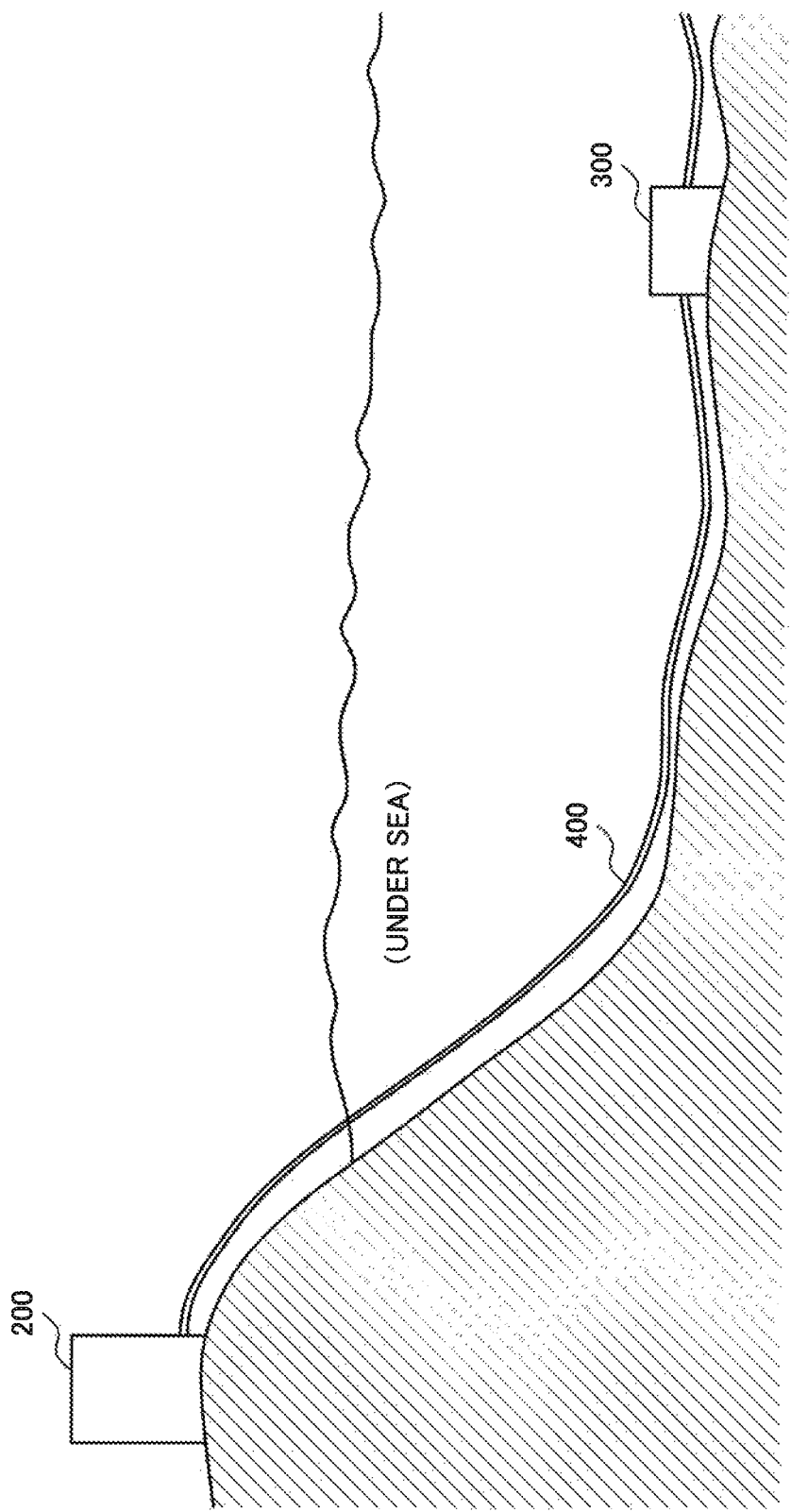
FIG. 2 is a system configuration diagram of a submarine cable system 100 according to a second example embodiment.

A second example embodiment will be described. A system configuration diagram of a submarine cable system according to the present example embodiment is illustrated in FIG. 2. In FIG. 2, a submarine cable system 100 includes a terminal device 200 including a power supply device, submarine equipment 300, and a submarine cable 400 interconnecting the both. The submarine cable system 100 is a system in which the total length of the distance including the terminal device 200 constructed on land and the submarine equipment 300 constructed on seabed is longer than or equal to 1000 km. It is difficult to supply a constant voltage to the undersea submarine equipment 300 from the power supply device constructed on land, and thus, the constant-current power supply scheme is employed in the submarine cable system 100. That is, a constant current (hereinafter referred to as a system current) is supplied to the submarine equipment 300, constructed on the seabed, from the power supply device, constructed on the land, through the submarine cable 400.

Figure 3:
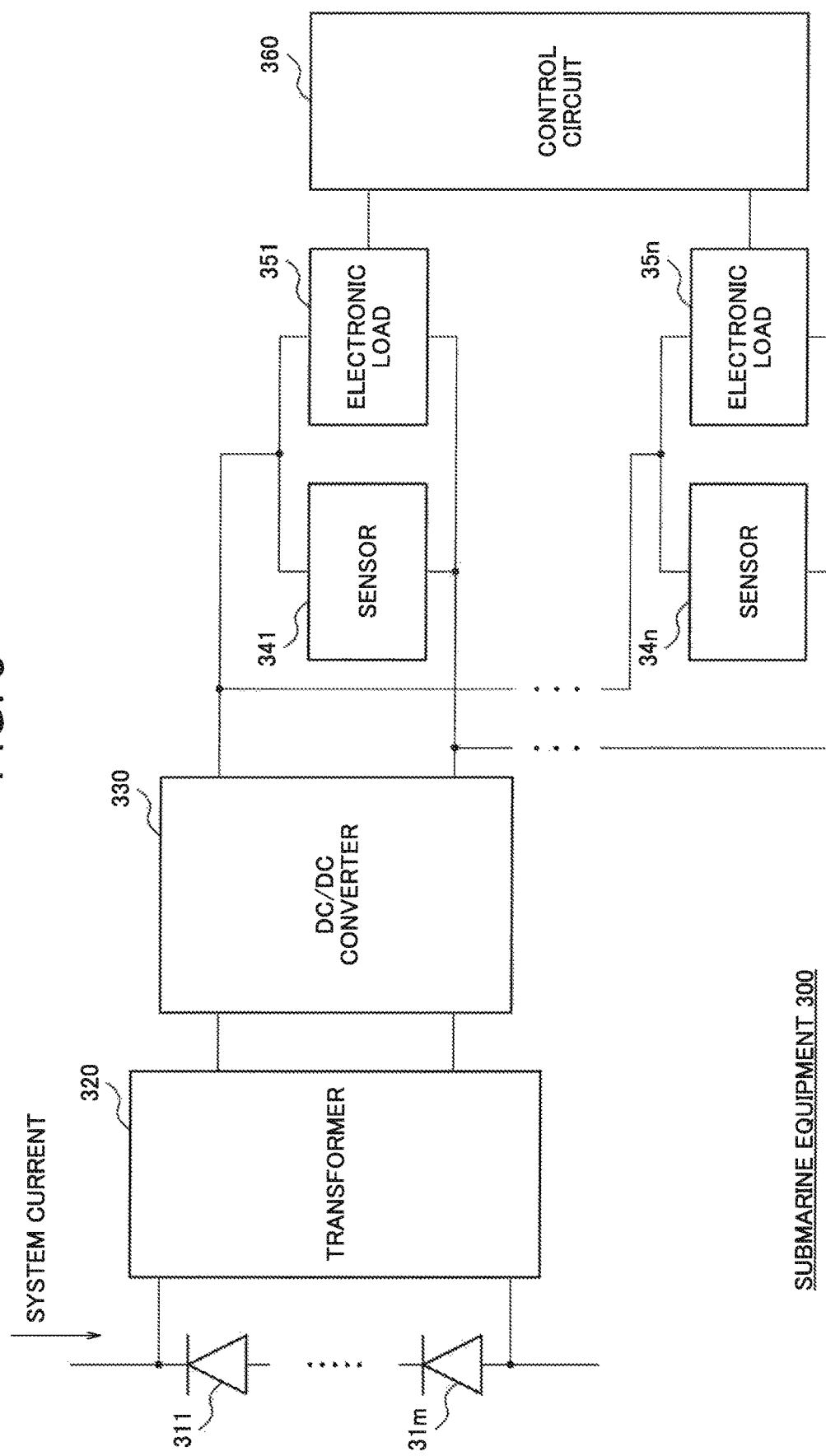
FIG. 3 is a circuit configuration diagram of submarine equipment 300 according to the second example embodiment.

A circuit configuration diagram of the submarine equipment 300 according to the present example embodiment is illustrated in FIG. 3. The submarine equipment 300 in FIG. 3 includes m Zener diodes 311 to 31*m*, a transformer 320, a direct current (DC)/DC converter 330, n sensors 341 to 34*n*, n electronic loads 351 to 35*n*, and a control circuit 360. Note that, in the case where the Zener diodes, the sensors, and the electronic loads are unnecessary to be individually identified, the Zener diodes, the sensors, and the electronic loads are respectively written as just Zener diodes 310, sensors 340, and electronic loads 350.

The m Zener diodes 311 to 31*m* are connected in series. A positive electrode is connected to the cathode of the Zener diode 311, and a negative electrode is connected to the anode of the Zener diode 31*m*. Further, the constant current supplied from the power supply device is allowed to flow through them Zener diodes 311 to 31*m*, thereby allowing a voltage to be generated between the cathode of the Zener diode 311 and the anode of the Zener diode 31*m*. The generation of the voltage between the cathode of the Zener diode 311 and the anode of the Zener diode 31*m* allows a constant voltage utilizing a breakdown voltage caused by the Zener effect to be obtained. Here, the result of a multiplication of the constant voltage obtained by the plurality of Zener diodes 310, which are connected in series, and the value of the above-mentioned system current becomes power supplied to the submarine equipment 300. Since the value of the system current is constant, the Zener diodes 310 whose number (which is m in the present example embodiment) relates to a power consumption inside the submarine equipment 300 are connected in series.

The transformer 320 converts a voltage within a voltage region constituted by the m Zener diodes 311 to 31*m*, and supplies a converted voltage to a voltage region constituted by the DC/DC convertor 330. Here, the voltage region constituted by the m Zener diodes 311 to 31*m* is referred to as a primary side, and the voltage region constituted by the DC/DC converter 330 is referred to as a secondary side. Specifically, the system current flowing through the m Zener diodes 311 to 31*m* generates magnetic field energy in a primary coil of the transformer 320, and the generated magnetic field energy is transmitted to a secondary coil of the transformer 320, thereby allowing a sensor driving current to flow at the side of the DC/DC converter 330. Here, the transformer 320 also includes the function of isolating/separating between the voltage region at the primary side at which the constant current having a high voltage is flowing and the voltage region at the secondary side from which a voltage of a predetermined magnitude is supplied to the sensors 341 to 34*n*.

The DC/DC converter 330 converts the electromagnetic energy supplied to the secondary side of the transformer 320 into individual voltages necessary in internal constituent elements of the submarine equipment 300, and supplies the converted voltages to the internal constituent elements of the submarine equipment 300. Here, the DC/DC converter 330 according to the present example embodiment supplies a supply current $A_0$ to each of the n sets of sensors 340 and electronic loads 350 as a power source for driving each of the sensors 341 to 34*n*.

Each of the n sensors 340 is driven by the power source supplied from the DC/DC converter 330, and measures data in relation to an ambient environment based on an instruction from the control circuit 360. The measurement of the data in relation to the ambient environment, and the like, on the seabed enables the submarine equipment 300 to function as an observation device for observing earthquake, resources, and the like. As the sensors 340, for example, an accelerometer, a water pressure meter, and the like can be applied. Note that, for the sensors 340, elements that make various measurements in response to purposes and intended uses can be applied.

Each of the electronic loads 351 to 35*n* is connected in parallel to a corresponding one of the sensor 341 to 34*n*. Each of the electronic loads 351 to 35*n* is controlled by the control circuit 360 and thereby adjusts the magnitude of a current flowing through a corresponding one of the sensors 341 to 34*n*, which is connected in parallel to the each of the electronic loads 351 to 35*n*. In the present example embodiment, as the electronic loads 351 to 35, variable resistors are applied. A resistance value of each of the electronic loads 351 to 35*n* is controlled by the control circuit 360, thereby allowing a constant current of a desired magnitude to flow through a corresponding one of the sensors 341 to 34*n*.

The control circuit 360 is controlled by the terminal device 200, which is constructed on land, and thereby controls power sources and other operation settings on the internal constituent elements of the submarine equipment 300. When turning on/off the power source of each of the sensors 341 to 34*n* or performing one of various kinds of operation settings on each of the sensors 341 to 34*n*, the control circuit 360 according to the present example embodiment controls the resistance value of a corresponding one of the electronic loads 351 to 35*n* based on a predetermined control program. Here, the control program includes, for each of operation contents of each of the sensors 341 to 34*n*, not only the resistance value of an electric load being among the electronic loads 351 to 35*n* and corresponding to the each of the sensors 341 to 34*n*, but also various kinds of control information, such as the change speed of the resistance value, the sequence order of the control, and the like.

Specifically, in the case where the power-source of a sensor 34*k* is in an off-state, the control circuit 360 controls the resistance value of an electronic load 35*k*, which is connected in parallel to the sensor 34*k*, in such a way that no current flows through the sensor 34*k*. That is, all of the supply current $A_0$, which is supplied from the DC/DC converter 330, flow to the side of the electronic load 35*k*.

Further, when changing the power-source of the sensor 34*k* from the off-state to an on-state, the control circuit 360 controls the resistance value of the electronic load 35*k* based on a predetermined control program for turning on the power source. For example, in the case where, in the sensor 34*k*, a supply current $A_1$ is necessary when its power-source is turned on, the control circuit 360 reduces the electric current flowing through the electronic load 35*k* from a current value $A_0$ to a current value $(A_0 - A_1)$ by controlling the resistance value of the electronic load 35*k* based on the control program for turning on the power source. Further, when the current flowing through the electronic load 35k has reached the predetermined current value ($A_0-A_1$), the power-source of the sensor 34k is turned on. With this configuration, the supply current $A_1$, which is necessary for turning on the power-source of the sensor 34k, is supplied to the sensor 34k, so that the power-source of the sensor 34k is turned on.

Moreover, in the case where the sensor 34k is allowed to perform an operation among various kinds of operations, the control circuit 360 controls the resistance value of the electronic load 35k based on a predetermined control program for starting the operation. For example, in the case where a supply current $A_2$ ($>A_1$) is necessary for allowing the sensor 34k to perform the operation, the control circuit 360 promptly reduces the current flowing through the electronic load 35k to a predetermined current value ($A_0-A_2$) by controlling the resistance value of the electronic load 35k based on the control program for starting the operation. Further, when the current flowing through the electronic load 35k has reached the predetermined current value ($A_0-A_2$), the operation of the sensor 34k is allowed to start. The current flowing through the electronic load 35k reaches the current value ($A_0-A_2$), thereby allowing the supply current $A_2$, which is necessary for allowing the sensor 34k to perform the operation, to be supplied, so that the sensor 34k starts the operation.

On the other hand, in the case where the operation of the sensor 34k is caused to stop, the control circuit 360 increases the current flowing through the electronic load 35k to the current value ($A_0-A_1$) by controlling the resistance value of the electronic load 35k based on a predetermined control program for stopping the operation. Further, when the current flowing through the electronic load 35k has reached the predetermined current value ($A_0-A_1$), the control circuit 360 stops the operation of the sensor 34k. Moreover, when changing the power-source of the sensor 34k from the on-state to the off-state, the control circuit 360 allows all of the supply current $A_0$ to flow to the side of the electronic load 35k by controlling the resistance value of the electronic load 35k based on a predetermined program for turning off the power source. Further, when the current flowing through the electronic load 35k has reached the current value $A_0$, the control circuit 360 turns off the power-source of the sensor 34k.

As described above, the control circuit 360 according to the present example embodiment proactively controls the resistance value of the electronic load 35k, which is connected in parallel to the sensor 34k, based on a control program that is predetermined for each of control contents of the sensor 34k to allow the value of a current flowing through the electronic load 35k to be promptly changed to a predetermined current value. With this configuration, as compared with a case where the variation of a current flowing through the sensor 34k is actively absorbed using a Zener diode or the like, a current most appropriate to the content of an operation of the sensor 34k can be set onto the electronic load 35k at high speed, thereby enabling the sensor 34k to promptly start the operation. Accordingly, even in the case where any one of power-source on/off control and various kinds of operation settings on each of the sensors 341 to 34n is performed at high speed, the submarine equipment 300 according to the present example embodiment is capable of supplying a necessary drive current to the each of the sensors 341 to 34n with the constant-current power supply scheme maintained.

Figure 4:
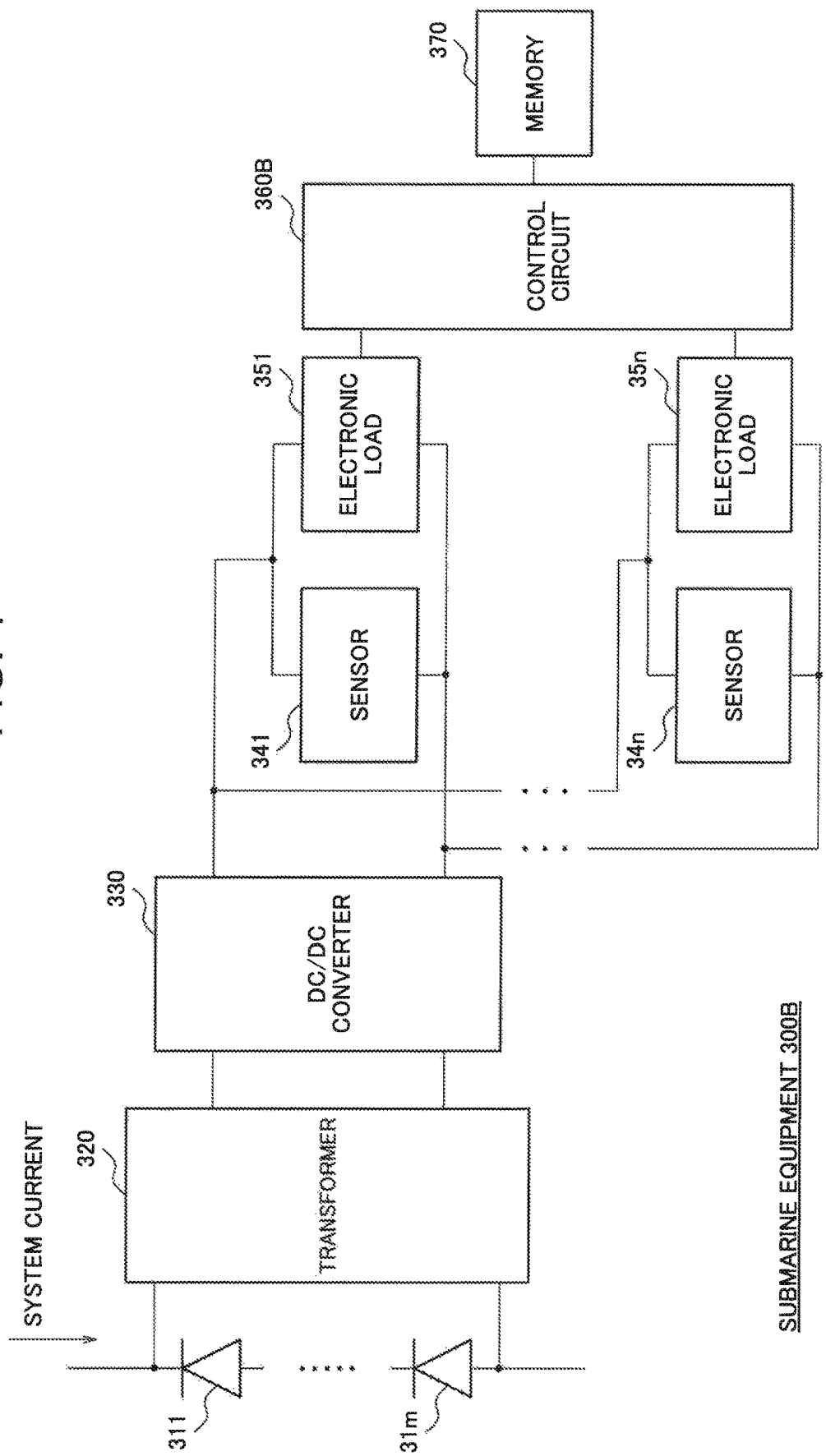
FIG. 4 is a circuit configuration diagram of another submarine equipment 300B according to the second example embodiment.
Figure 5:
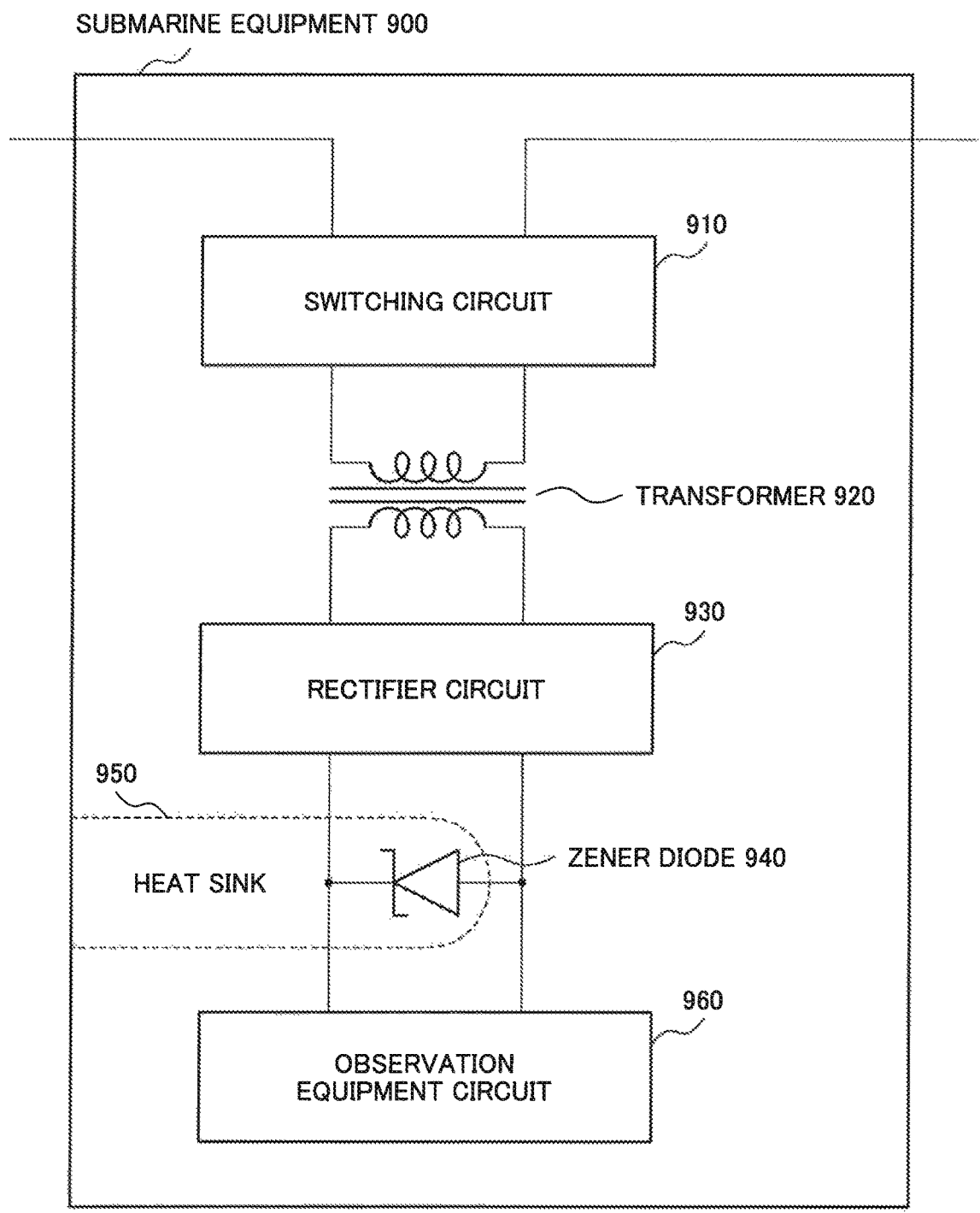
FIG. 5 is a block configuration diagram of submarine equipment 900 in PTL 1.

In addition, the above-mentioned control program can be retained in the submarine equipment 300 in advance, and a block configuration diagram of submarine equipment in this case is illustrated in FIG. 4. In submarine equipment 300B in FIG. 4, a memory 370 stores therein, for each of operation contents of each of the sensors 341 to 34n, a control program for controlling the resistance value of an electronic load being among the electronic loads 351 to 35n and corresponding to the each of the sensors 341 to 34n. Further, a control circuit 360B retrieves, from the memory 370, a control program corresponding to control content instructed from the terminal device 200, and controls the resistance value of one of the electronic loads 351-35n based on the retrieved control program.

Here, the above-mentioned control program can be stored in an external storage device. In this case, the terminal device 200 retrieves a necessary control program from the external storage device, and remotely controls the control circuit 360 based on the retrieved control program.

The present invention is not limited to the aforementioned example embodiments, and even if there exists any design modification or the like falling within the scope not departed from the gist of the present invention, the design modification is included in the present invention.

This application is based upon and claims the benefit of priority from Japanese Patent Application No. 2015-164938, filed on Aug. 24, 2015, the disclosure of which is incorporated herein in its entirety by reference.

REFERENCE SIGNS LIST 10 constant current supply device
20 constant voltage acquisition means
30 conversion means
41 to 4n drive element
51 to 5n current control element
60 control means
100 submarine cable system
200 terminal device
300 and 300B submarine equipment
311 to 31m Zener diode
320 transformer
330 DC/DC converter
341 to 34n sensor
351 to 35n electronic load
360 and 360B control circuit
370 memory
400 submarine cable
900 submarine equipment
910 switching circuit
920 transformer
930 rectifier circuit
940 Zener diode
950 heat sink
960 observation equipment circuit

What is claimed is:

1. A constant current supply device comprising:
a voltage acquisition circuit configured to extract a constant voltage from a supplied constant current;
a converter configured to convert the constant voltage extracted into a drive current of a desired magnitude, and outputting the drive current;
a driven circuit and a current control circuit which are connected in parallel to each other and to which the drive current is input; and
a controller configured to, in response to each of at least one control content of the driven circuit, control a magnitude of a drive current which flows through the current control circuit.

2. The constant current supply device according to claim 1,
wherein
in a case where a drive current having a current value $A_0$ is supplied from the converter to the driven circuit and the current control circuit; a current having a current value $A_1$ is consumed during a period of power-on of the driven circuit; and a current having a current value $A_2$ larger than the current value $A_1$ is consumed during an operation of the driven circuit, the controller
reduces the drive current flowing through the current control circuit from a current having the current value $A_0$ to a current having a current value $(A_0-A_1)$ resulting from subtracting the current value $A_1$ from the current value $A_0$ when turning on a power source of the driven circuit;
reduces the drive current flowing through the current control circuit from the current having the current value $(A_0-A_1)$ to a current having a current value $(A_0-A_2)$ resulting from subtracting the current value $A_2$ from the current value $A_0$ when starting the operation of the driven circuit;
increases the drive current flowing the current control circuit from the current having the current value $(A_0-A_2)$ to the current having the current value $(A_0-A_1)$ when stopping the operation of the driven circuit; and
increases the drive current flowing the current control circuit from the current having the current value $(A_0-A_1)$ to the current having the current value $A_0$ when turning off the power source of the driven circuit.

3. The constant current supply device according to claim 1, further comprising a storage circuit configured to store in itself, for each of the at least one control content of the driven circuit, a control program for controlling the magnitude of the drive current flowing through the driven circuit,
wherein the controller retrieves the control program corresponding to each of the at least one control content of the driven circuit, and controls the magnitude of the drive current flowing through the current control circuit based on the retrieved control program.

4. The constant current supply device according to claim 1, wherein the current control circuit is a variable resistor.

5. The constant current supply device claim 1, further comprising a transformer disposed between the constant voltage acquisition circuit and the converter and configured to transform the constant voltage into a predetermined drive voltage, wherein
the converter outputs the drive current from the drive voltage supplied to the converter.

6. The constant current supply device according to claim 1, wherein
a plurality of sets each constituted by the driven circuit and the current control circuit, which are connected in parallel to each other, is connected to the converter.

7. The constant current supply device according to claim 1, wherein
the constant voltage acquisition circuit is supplied with the constant current from a power supply device placed on land via a submarine cable, and the driven circuit is one of sensor circuits for making various measurements on seabed.

8. The constant current supply device according to claim 1, wherein the constant voltage acquisition circuit is constituted by a plurality of Zener diodes connected in series.

9. A constant current supply system comprising:
a power supply device placed on land for supplying a constant current; and
the constant current supply device according to claim 1, wherein the constant current supply device is placed on seabed and is supplied with the constant current via a submarine cable.

10. A constant current supply method using a current control circuit connected in parallel to a driven circuit that operates by being supplied with a constant current, the method comprising:
extracting a constant voltage from a supplied constant current;
converting the constant voltage extracted into a drive current of a desired magnitude, and outputting the drive current;
supplying the output drive current to the driven circuit and the current control circuit; and
in response to each of at least one control content of the driven circuit, controlling a magnitude of a drive current which flows through the current control circuit.

11. The constant current supply device according to claim 2, further comprising a storage circuit configured to store in itself, for each of the at least one control content of the driven circuit, a control program for controlling the magnitude of the drive current flowing through the driven circuit,
wherein the controller retrieves the control program corresponding to each of the at least one control content of the driven circuit, and controls the magnitude of the drive current flowing through the current control circuit based on the retrieved control program.

12. The constant current supply device according to claim 2, wherein the current control circuit is a variable resistor.

13. The constant current supply device claim 2, further comprising a transformer disposed between the constant voltage acquisition circuit and the converter and configured to transform the constant voltage into a predetermined drive voltage,
wherein
the converter outputs the drive current from the drive voltage supplied to the converter.

14. The constant current supply device according to claim 2, wherein
a plurality of sets each constituted by the driven circuit and the current control circuit, which are connected in parallel to each other, is connected to the converter.

15. The constant current supply device according to claim 2, wherein
the constant voltage acquisition circuit is supplied with the constant current from a power supply device placed on land via a submarine cable, and the driven circuit is one of sensor circuits for making various measurements on seabed.

16. The constant current supply device according to claim 2, wherein the constant voltage acquisition circuit is constituted by a plurality of Zener diodes connected in series.

17. A constant current supply system comprising:
a power supply device placed on land for supplying a constant current; and
the constant current supply device according to claim 2, wherein the constant current supply device is placed on seabed and is supplied with the constant current via a submarine cable.

18. The constant current supply device according to claim 3, wherein the current control circuit is a variable resistor.

19. The constant current supply device claim 3, further comprising a transformer disposed between the constant voltage acquisition circuit and the converter and configured to transform the constant voltage into a predetermined drive voltage,
   wherein
      the converter outputs the drive current from the drive voltage supplied to the converter.

20. The constant current supply device according to claim 3, wherein
   a plurality of sets each constituted by the driven circuit and the current control circuit, which are connected in parallel to each other, is connected to the converter.

* * * * *